Reissued Feb. 22, 1927. Re. 16,556

UNITED STATES PATENT OFFICE.

FRANK A. FAHRENWALD, OF CHICAGO, ILLINOIS.

FIREARM AND ALLOY FOR MAKING SAME.

No Drawing. Original No. 1,346,188, dated July 13, 1920, Serial No. 319,822, filed August 25, 1919. Application for reissue filed October 15, 1926. Serial No. 141,871.

This invention relates to firearms and ordnance and has for its particular object the provision of a metallic alloy for use in the construction of the same which shall be more resistant to corrosion by the combustion products of the explosive as well as less corroded by atmospheric conditions, salt solution (such as sea water or sweaty hands) than anything previously used for the purpose, as well as having sufficient mechanical strength to endure the strains to which such devices are subjected and at the same time being sufficiently soft and workable for manufacturing purposes.

It is well known that powder gases particularly those of the present day smokeless and high explosive powders are extremely corrosive to steel barrels so that the latter become rapidly etched and pitted. This circumstance has greatly shortened the life of sporting arms and has rendered very onerous the maintenance of military arms of all calibers, since not only have the metals heretofore employed suffered greatly by the instant erosion of the hot gases but the powder residues are of an equally great corrosiveness and cannot be removed by mere physical means nor even by a single application of chemicals. Unless such a firearm be cleaned within at least an hour after each shot, the barrel interior becomes noticeably etched, and even a few very small pits seriously impairs the accuracy of the gun. Likewise the exteriors of the barrels and the surfaces of the operating mechanism become rapidly corroded by atmospheric influences and skin contact unless frequently oiled. Furthermore, most high velocity rifle bullets used at the present day are jacketed with some alloy which will keep the lead from melting and will engage the rifling properly. Most of these jacket materials possess such an affinity for the iron of which rifle barrels have heretofore been made as to alloy therewith under the influence of high temperature, velocity and pressure, thus producing the phenomenon known as "metal fouling", which means a slow accretion inside the barrel of substance taken from the bullets which always interferes seriously with the accuracy and frequently leads to bursting of the barrel.

Numerous alloys have heretofore been known which would resist the chemical action to the necessary extent, (such as alloys of platinum, gold-palladium, and the like precious metals), but the physical requirements of firearms metal are also peculiarly exacting since it must be sufficiently soft and uniform to permit of ready boring and rifling of the barrel and fashioning of the operating mechanism, and yet possess sufficient toughness and mechanical strength to resist the explosion pressures and the mishaps to which such devices are necessarily subjected in use.

The objects of my invention are, therefore, the provision of an alloy for the purposes stated having the requisite chemical resistivity coupled with the necessary physical strength; the provision of an alloy which shall not be subject to "metal fouling"; the provision of an alloy which can be readily forged, machined and worked into shape; the provision of an alloy of reasonably low intrinsic valve and containing only readily available ingredients; the provision of an alloy which can be made by a simple and workable process; while further objects and advantages of my invention will become apparent as the description proceeds.

My improved alloy consists essentially of iron combined with one or more chromium group metals. Carbon and silicon may be present in case their quantities are small, say .5% or less; a small amount of manganese is preferably employed because of its value in scavenging oxygen and sulphur and because of the fact that better castings are secured with its use. The tensile strength of the alloy can be increased slightly by the addition of a small amount of copper, tantalum, vanadium, zirconium, or titanium, although the strength of the simpler alloy is sufficiently great so that no particular advantage is secured by their use. All these minor modifications fall within the scope of my generic idea and the presence or absence of these additional substances does not modify my invention.

As examples of alloys which embody my invention, I will instance the following, the first column indicating the preferred composition within that group and the parenthesis indicating the permissible variations.

| | | | |
|---|---|---|---|
| *a* | Iron | 75 | (60–90) |
| | Chromium | 25 | (10–40) |
| *b* | Nickel | 85 | (70–95) |
| | Chromium | 15 | ( 5–30) |
| *c* | Nickel | 90 | (85–95) |
| | Tungsten or molybdenum | 10 | ( 5–15) |
| *d* | Iron | 90 | (80–95) |
| | Tungsten or molybdenum | 10 | ( 5–20) |
| *e* | Any two iron group metals | 90 | (75–95) |
| | Tungsten or molybdenum | -- | ( 5–25) |

It will be understood that the foregoing formulas are not intended to include all the ingredients present in the alloys, since small amounts of carbon, silicon, and manganese will almost always be present at least as impurities, and small quantities of certain additional metals may sometimes be added such as copper etc. as has already been suggested. It is only necessary that the percentage of carbon and silicon be kept sufficiently low, such as .5% or less of each, to prevent the metal from being too hard to work, and that sulphur and phosphorus be avoided.

When one adds to the corrosion resisting requirements and the strength and hardness limitations heretofore described the further requirement of a low intrinsic value it is found that the alloy which best fulfills all these demands is one falling within group *a* above indicated, namely a binary alloy of iron and chromium which contains no other element or ingredient at least in a quantity sufficient to exhibit any substantial physical or chemical effect. Hence the carbon must be kept low, ½% of this element being the uppermost permissible limit and .2% being much better. Also any admixture of nickel or cobalt is undesirable for the same reason, namely an increase in hardness, although this effect does not become noticeable with a nickel or cobalt content of less than about ½%. It can be made with comparative ease in the electric furnace or by the aluminothermic method it makes a good casting, can readily be forged or rolled at a bright red heat, and can be bored, turned, rifled and shaped without difficulty. The gases and residues of smokeless powder do not etch it even in days of neglect, rain does not rust it, and polished barrels buried in the ground for weeks exhibit only a slight superficial tarnish which can be wiped off with the hand. Bullet jackets of iron, nickel, or their alloys do not foul it, and its tensile strength is so high that it compares well with the steels ordinarily used.

This alloy is good enough for most purposes and has the advantages of being much cheaper a much more easily rolled and machined than any of the more complicated, ternary or quaternary alloys. It can be slightly improved by the addition of a little molybdenum or tungsten, which have the effect of increasing the chemical resistivity without proportionately increasing the hardness.

The substitution of nickel for iron in *a* gives *b* which is superior in the same proportion that nickel is superior to iron in chemical resistivity. Owing to the hardening effect of chromium thereon the proportion of the latter is decreased. Iron must also be omitted because of its hardening effect when used in conjunction with nickel. It will be understood that cobalt can be employed in substitution for nickel although no advantage in its use offsets its high price.

If tungsten or molybdenum be employed in place of chromium in *b*, I secure the alloy shown at *c* which is also hard, strong and chemically resistant; or if the chromium in *a* is replaced by tungsten or molybdenum I secure the alloy shown at *d* which is also of value for firearms. In these cases the amount of the tungsten-like metal is decreased owing to its hardening effect.

I find that the essential elements are those contained in the iron and chromium groups of the periodic table and that at least one metal from each group should be used; also that only a single iron group metal should be used owing to their mutual hardening effect when used together and that the chromium group metal should occur to an amount of at least about 5% and may go as high as 40% when the iron group metal is iron alone and the chromium group metal be chromium alone without rendering the alloy too hard to work.

It will be understood that while my improved alloy is specially devised for manually portable arms such as rifles and shotguns it is equally good for pocket devices such as revolvers or for ordnance of large sizes; that the barrels can be made from a single homogeneous piece of the material, or that a composite ingot may be made, or a built up barrel employing my improved alloy as a lining; that my alloy can be used for lock mechanisms equally with the barrels; and that I desire my claims taken in the broadest sense that their language will support.

Having thus described my invention what I claim is:

1. A firearm barrel made from an alloy of one iron group metal combined with one or more chromium group metals, any second iron group metal being restricted to less than ½% and carbon being not over ½%.

2. A firearm barrel made from an alloy of one iron group metal combined with one or more chromium group metals, the latter being present to an amount of at least 5%, and no other substance being present in an amount greater than ½%.

3. A firearm barrel made from an alloy of iron together with at least one chromium group metal, nickel if present at all being restricted to less than ½%.

4. A firearm barrel made from an alloy of two iron group metals together with chromium and another metal from the chromium group and less than ½% of carbon.

5. A firearm barrel made from an alloy containing at least 5% of chromium, less than .5% of nickel and more than 60% of iron.

6. A firearm barrel made from an alloy containing between 5% and 25% of one or more metals of the chromium group combined with a metal of the iron group, not more than .5% of the whole alloy being nickel.

7. A firearm having a barrel composed of or lined with an alloy of iron, and chromium wherein the chromium comprises not less than about 10% of the whole, and carbon not over .5% of the whole.

8. A firearm having parts made of an alloy containing not less than about 80% of iron alloyed with not more than .5% of nickel and at least 8% of chromium.

9. A firearm having parts made of an alloy comprising between 8% and 20% chromium, together with between about 80% and 92% iron, and other elements, if present, being restricted to less than about .5%.

10. A firearm having a barrel made of an alloy containing essentially iron and chromium, the iron constituting at least 80% and the chromium at least 10% of the alloy, and no other element being present in sufficient amount to exert any appreciable hardening effect.

11. A firearm having parts made of an alloy containing less than 90% of iron combined with at least 5% of a metal from the chromium group, and excluding any substantial percentage of any other iron group metal, carbon being restricted to an amount sufficiently small to avoid any appreciable hardening effect.

12. A firearm having a barrel composed of or lined with a binary alloy containing between 30% and 90% of iron, and at least 10% of chromium.

13. A firearm having a barrel composed of or lined with a binary alloy containing not over 90% of iron and not less than 10% of chromium.

14. A firearm having a barrel composed of or lined with an alloy containing a preponderance of iron group metals together with from 5% to 20% of metals below chromium in the chromium group.

15. A firearm having a barrel composed of or lined with an alloy containing a single iron group metal to a total of from 75% to 95%, the balance being chromium group metals and carbon being restricted to less than ½%.

16. A firearm having a barrel composed of or lined with an alloy containing a single iron group metal to a total proportion of between 75% and 90% combined with chromium group metals, chromium itself constituting at least one-half of the balance.

17. A firearm barrel made of an alloy containing iron combined with at least ten percent of chromium and less than .5% of any other substance or substances.

18. A firearm barrel made of an alloy containing between about twenty-five percent and about ninety percent of iron, the balance being chromium and carbon being present to an amount not greater than two tenths of one percent.

19. A firearm barrel made of an alloy consisting essentially of iron with either or both nickel and (or) chromium, the highest limit of chromium being about twenty-five percent and the highest limit of iron being about ninety percent the highest limit of nickel being about one-half percent and the lowest limit of chromium being not less than about ten percent.

FRANK A. FAHRENWALD.